J. D. FILBIN.
SPRAYING HEAD OR NOZZLE.
APPLICATION FILED NOV. 4, 1914.
1,142,410.
Patented June 8, 1915.
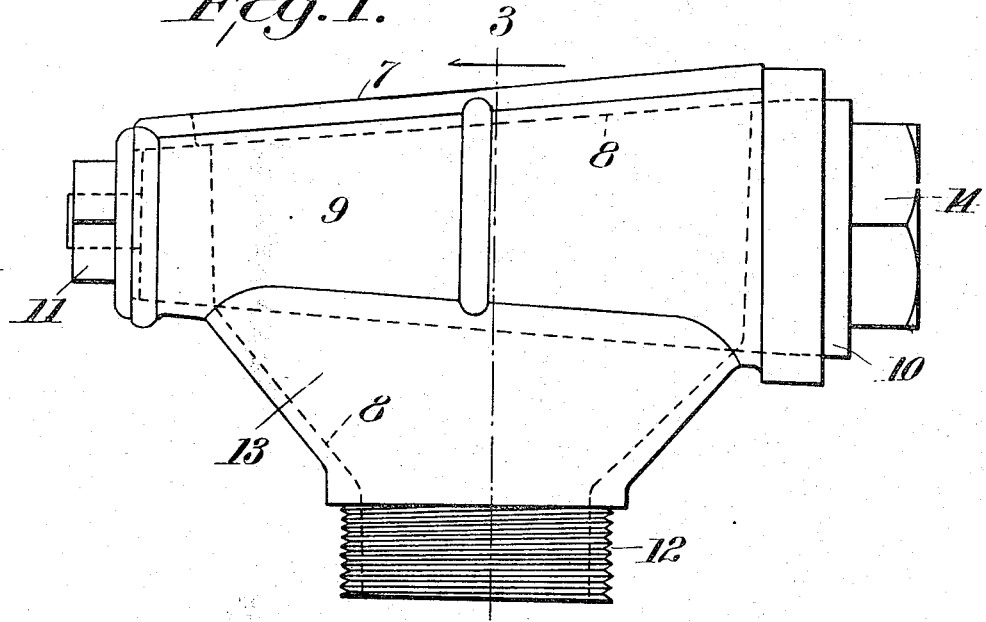
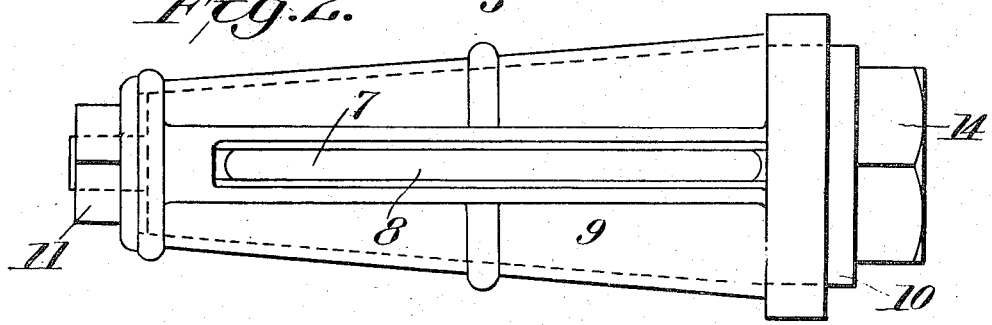
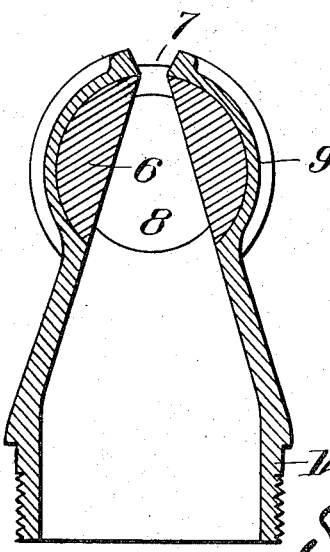

UNITED STATES PATENT OFFICE.

JAMES D. FILBIN, OF CLEVELAND, OHIO, ASSIGNOR TO THE LAKE CITY MANUFACTURING AND SUPPLY COMPANY, OF CLEVELAND, OHIO, A CORPORATION.

SPRAYING HEAD OR NOZZLE.

1,142,410. Specification of Letters Patent. Patented June 8, 1915.

Application filed November 4, 1914. Serial No. 870,214.

*To all whom it may concern:*

Be it known that I, JAMES D. FILBIN, citizen of the United States, residing at Cleveland, in the county of Cuyahoga and State of Ohio, have invented certain new and useful Improvements in Spraying Heads or Nozzles, of which the following is a specification.

This invention relates to spraying heads or nozzles, such as are especially adapted for use in connection with a street flushing or sprinkling machine.

The device is particularly an improvement on the spraying head shown in the U. S. patent to Jackson No. 996,767 dated July 4, 1911.

The present improvement relates particularly to the structure of the casing containing the turning or rotary plug valve, and is intended to provide a better supply of water to the nozzle, so as to give a clear and unobstructed stream of maximum efficiency and even distribution, avoiding what is known as "pocketing" of water in the spraying head.

The invention will be more clearly understood from the following description and the accompanying drawings in which—

Figure 1 is a side view of the head or nozzle. Fig. 2 is a front or face view. Fig. 3 is a section on the line 3—3 of Fig. 1.

Referring specifically to the drawings, 9 indicates a tapered tubular casing provided on one side with the inlet connection 12 and on the other side with an outlet mouth or slot 7 which extends lengthwise almost the whole length of the casing and has projecting lips as shown. Fitting within this casing is a tapered plug 6, which can be turned to open or close the discharge outlet. This plug has extending across the same a converging passage 8. In the patent above referred to the passage 8 is flared from a circular opening at the middle, where the inlet connection joins, to a narrow outlet slot at the opposite side, corresponding to the mouth 7, and the inlet connection 12 is also circular. In the present improvement, the passage 8 through the plug does not diverge from the middle circular opening, but extends substantially the same shape throughout its whole length. That is, the passage through the plug is as long on the inlet side as on the outlet side. And the circular connection 12, instead of being joined directly to the casing 9, is connected thereto by an elongated or flared neck 13. Consequently the water spreads before it enters the plug, instead of being spread within the plug, as in the patent above referred to, and the water has a comparatively free and unobstructed flow through the passage in the plug. This has been found to give a better distribution and a more effective discharge than the structure in the patent above referred to.

The other parts are not substantially changed, that is, the plug is provided with a nut 11 at the small end and a gasket 10 at the large end, and the stem of the plug is squared as at 14 to receive an operating lever or device.

With respect to the action of the head, water which enters the same through the inlet 12 will spread laterally in the triangular or flared neck 13 and will then be discharged through the cross-passage 8, flowing in a sheet through the mouth 7 when the head is fully opened. By turning the plug the outlet may be controlled, and when restricted the water will be discharged in a thinner sheet or spray. When it is desired to flush the street, the head is opened to the full extent; for sprinkling purposes the opening is decreased until the desired effect is produced. By reason of the water chamber formed by the flared neck 13, extending along the full length of the plug, the supply is substantially uniform along the full length of the mouth, in all open positions of the plug.

What I claim as new is:

A spraying head comprising an elongated casing having a discharge slot extending lengthwise on one side thereof, and a water inlet neck flattened and broadened laterally and extending lengthwise along the opposite side of the casing, and a turning plug in the casing, having a cross passage the walls of which converge in a plane transverse to the axis of the plug, the passage being substantially the same length as the broadest part of the neck and substantially the same width along its inlet side as the width of the adjacent neck opening.

In testimony whereof, I affix my signature in presence of two witnesses.

JAMES D. FILBIN.

Witnesses:
JOHN A. BOMMHARDT,
J. B. DAVIS.